(12) United States Patent
Hadjerioua

(10) Patent No.: US 10,696,363 B2
(45) Date of Patent: Jun. 30, 2020

(54) FLOATING MEMBRANE RESERVOIR SYSTEM

(71) Applicant: UT-Battelle, LLC, Oak Ridge, TN (US)

(72) Inventor: Boualem Hadjerioua, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 30 days.

(21) Appl. No.: 16/273,423

(22) Filed: Feb. 12, 2019

(65) Prior Publication Data

US 2019/0256172 A1    Aug. 22, 2019

Related U.S. Application Data

(60) Provisional application No. 62/631,529, filed on Feb. 16, 2018, provisional application No. 62/683,052, filed on Jun. 11, 2018.

(51) Int. Cl.
| | |
|---|---|
| *B63B 35/28* | (2006.01) |
| *E02B 9/00* | (2006.01) |
| *F03B 13/06* | (2006.01) |
| *B63B 35/00* | (2020.01) |

(52) U.S. Cl.
CPC ............ *B63B 35/285* (2013.01); *B63B 35/00* (2013.01); *E02B 9/00* (2013.01); *F03B 13/06* (2013.01); *B63B 2735/00* (2013.01); *F05B 2240/40* (2013.01); *F05B 2240/93* (2013.01); *F05B 2250/02* (2013.01); *F05B 2250/23* (2013.01)

(58) Field of Classification Search
CPC ... B63B 35/285; B63B 38/00; B63B 2735/00; E02B 9/00; E02B 1/00; B65D 88/78; A01K 61/60; Y02A 40/826; Y10T 137/402
USPC ....... 61/1 R, 21, 101; 114/256, 257; 43/7, 8; 137/236.5, 236.1; 141/1, 10; 165/45; 210/83, 170, 242 R, 205, 170.05; 405/52, 405/210; 119/3, 223

See application file for complete search history.

(56) References Cited

U.S. PATENT DOCUMENTS

| | | | | |
|---|---|---|---|---|
| 34,426 A | * | 2/1862 | Howard | ................ B63B 35/285 114/256 |
| 1,421,326 A | * | 6/1922 | Waller | .................... B63B 35/00 104/23.1 |

(Continued)

*Primary Examiner* — Benjamin F Fiorello
*Assistant Examiner* — Edwin J Toledo-Duran
(74) *Attorney, Agent, or Firm* — Warner Norcross + Judd LLP

(57) ABSTRACT

An improved system and method of storing water for a closed-loop pumped storage hydroelectric system is provided. The method includes providing a floating reservoir, positioning the floating reservoir in a waterbody, loading the floating reservoir with a volume of water from a source other than the surrounding waterbody, and transferring water from within the floating reservoir to an upper or lower reservoir of a pumped storage hydroelectric system. The floating reservoir includes a flexible membrane defining one or more reservoir cells including a vertically collapsible sidewall, such that each reservoir cell defines a depth varying in proportion to its internal volume of water. Each reservoir cell is buoyed by pontoons adjacent an outer periphery of the reservoir cell and is anchored to the shore or streambed.

20 Claims, 10 Drawing Sheets

(56) References Cited

U.S. PATENT DOCUMENTS

| | | | | |
|---|---|---|---|---|
| 1,925,175 A * | 9/1933 | Day | E04H 4/0012 | 4/487 |
| 2,084,005 A * | 6/1937 | Richards | A01G 27/06 | 47/80 |
| 2,405,118 A * | 8/1946 | Delano | C02F 1/14 | 202/234 |
| 3,026,538 A * | 3/1962 | Boyd | E04H 4/0012 | 4/487 |
| 3,078,472 A * | 2/1963 | Salisbury | E04H 4/0012 | 4/487 |
| 3,099,018 A * | 7/1963 | O'Connell | E04H 4/0012 | 4/487 |
| 3,133,443 A * | 5/1964 | Timmerman, Sr. | B65D 90/48 | 73/299 |
| 3,245,539 A * | 4/1966 | Earle | B01D 17/0214 | 210/242.3 |
| 3,602,925 A * | 9/1971 | Thompson | E04H 4/0012 | 4/487 |
| 3,640,073 A * | 2/1972 | Samsel | E02B 15/0814 | 405/70 |
| 3,653,215 A * | 4/1972 | Crucet | E21B 43/0122 | 405/60 |
| 3,820,172 A * | 6/1974 | Kane | B05B 1/14 | 4/490 |
| 3,984,987 A * | 10/1976 | Light, Jr. | E02B 3/00 | 405/63 |
| 4,087,870 A * | 5/1978 | Palmer, Jr. | E04H 4/0012 | 4/487 |
| 4,231,873 A * | 11/1980 | Swigger | B65D 88/78 | 210/170.05 |
| 4,480,966 A * | 11/1984 | Smith | F03B 13/1815 | 417/332 |
| 4,867,608 A * | 9/1989 | Kinghorn | E02B 3/125 | 405/188 |
| 5,638,556 A * | 6/1997 | Kipers | E04H 4/0012 | 4/488 |
| 9,920,498 B2 * | 3/2018 | Fischmann | E04H 4/0012 | |
| 2004/0139898 A1 * | 7/2004 | Tupil | B63B 35/285 | 114/74 R |
| 2004/0144294 A1 * | 7/2004 | Yaffe | B63B 27/24 | 114/74 T |
| 2004/0154515 A1 * | 8/2004 | Yaffe | B63B 35/285 | 114/74 T |
| 2005/0126977 A1 * | 6/2005 | Carter | C02F 1/285 | 210/242.4 |
| 2005/0198730 A1 * | 9/2005 | Li | E04H 4/0012 | 4/496 |
| 2007/0290508 A1 * | 12/2007 | Burcik | F03B 13/1875 | 290/53 |
| 2008/0302291 A1 * | 12/2008 | Chen | B63B 35/44 | 114/266 |
| 2009/0250393 A1 * | 10/2009 | Williams | C02F 3/28 | 210/602 |
| 2012/0080194 A1 * | 4/2012 | Birdwell | E21B 43/0122 | 166/345 |
| 2013/0084134 A1 * | 4/2013 | Alsaffar | B63B 27/34 | 405/66 |
| 2014/0303810 A1 * | 10/2014 | van der Meijden | E04H 4/1654 | 701/2 |
| 2014/0339169 A1 * | 11/2014 | Zeren | B01D 61/025 | 210/652 |
| 2015/0125212 A1 * | 5/2015 | Fischmann | B01D 21/0012 | 405/63 |
| 2015/0337554 A1 * | 11/2015 | MacDonald | E04H 4/14 | 137/78.1 |
| 2017/0350085 A1 * | 12/2017 | Cargol | B63B 35/32 | |
| 2018/0213713 A1 * | 8/2018 | Zito, Jr. | A01K 61/00 | |

\* cited by examiner

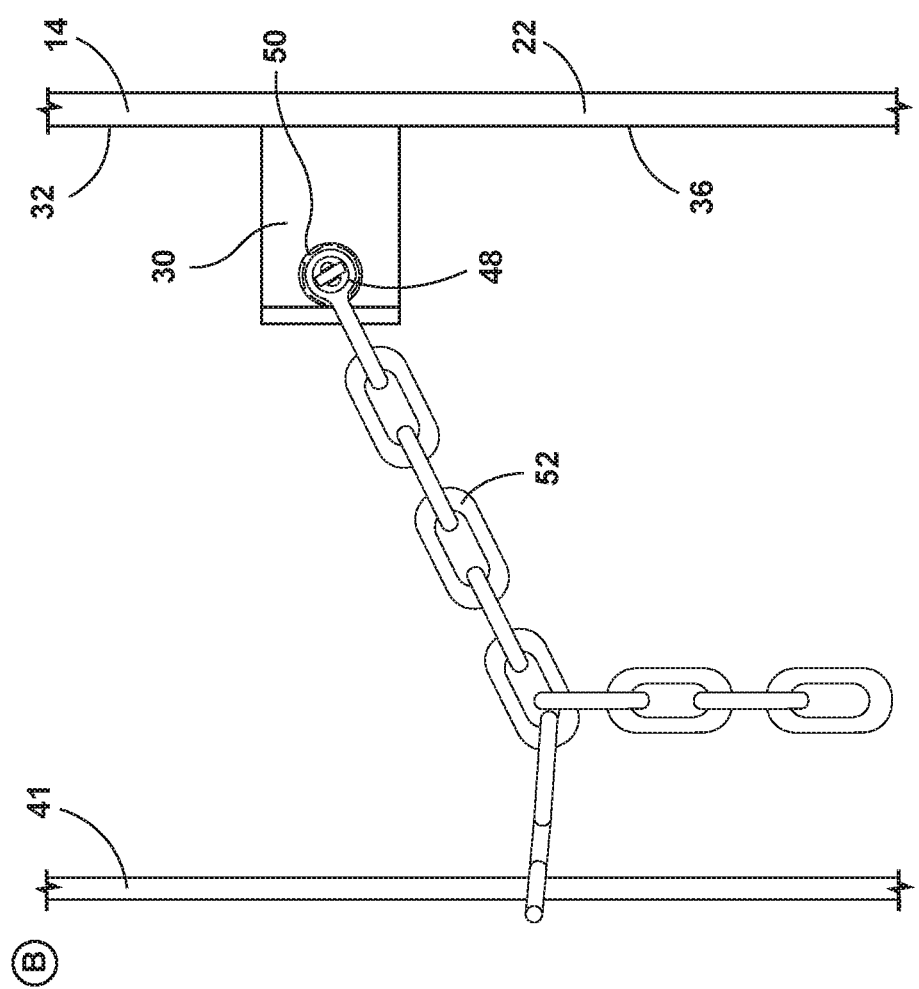
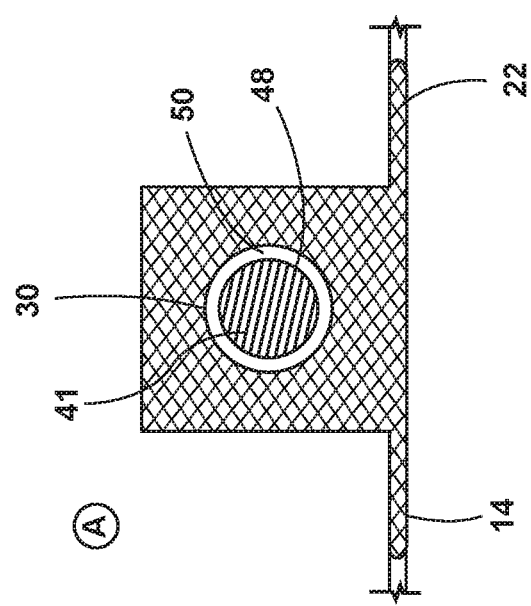
FIG. 7

FLOATING MEMBRANE RESERVOIR SYSTEM

CROSS-REFERENCE TO RELATED APPLICATIONS

This application claims the benefit of U.S. Provisional Application No. 62/631,529, filed on Feb. 16, 2018, and U.S. Provisional Application 62/683,052, filed on Jun. 11, 2018, the disclosures of which are hereby incorporated by reference in their entirety.

STATEMENT REGARDING FEDERALLY SPONSORED RESEARCH

This invention was made with government support under Contract No. DE-AC05-00OR22725 awarded by the U.S. Department of Energy. The government has certain rights in the invention.

FIELD OF THE INVENTION

The present invention relates to closed-loop pumped storage hydroelectric power systems and methods for using the same.

BACKGROUND OF THE INVENTION

An ongoing challenge in the energy industry, and particularly in the renewable energy industry, is how best to address fluctuations both in energy demand and energy production over time. One means of addressing this challenge is using pumped storage hydroelectricity. Pumped storage hydroelectricity is a type of hydroelectric energy storage that requires an upper reservoir and a lower reservoir for water storage, water conveyances for water transfer, and hydroelectric equipment for power generation. During periods of low electrical demand when prices are low, water is pumped from the lower reservoir to the higher reservoir. During periods of high electrical demand when electricity can be sold at higher prices, water stored in the upper reservoir is released through turbines to produce hydroelectric power.

Despite the benefits of pumped storage hydroelectric systems, creating storage reservoirs can require massive civil works construction that can be highly expensive and have a detrimental impact on the environment. Therefore, there exists a need for reservoir systems for use in pumped storage hydroelectric power systems that minimize environmental impacts and capital investment. Further, there exists a need for closed-loop pumped storage hydroelectric power systems that are modular, pre-constructed, readily transportable, simple to install, safe, adaptable to various site needs, scalable, aesthetically acceptable, and socially acceptable.

SUMMARY OF THE INVENTION

An improved system and method of storing water for pumped storage hydroelectric systems is provided. The method includes providing a floating reservoir system capable of remaining in a floating position fixed within the waterbody and reacting to water being filled or emptied. While the method is intended for pumped storage hydropower application, it is not limited to specific equipment used to transfer water into or out of the reservoir. The floating reservoir system includes a flexible membrane defining a reservoir cell that is vertically raised or lowered as water fills or leaves the cell, such that each cell contains a water depth varying in proportion to its internal volume of water. Each reservoir cell is buoyed by a floating apparatus adjacent an outer periphery of the reservoir cell and is anchored to the shore or streambed. A single reservoir may be used, or a plurality of modular reservoirs may be used, as well.

In one embodiment, a modular floating membrane reservoir system includes a flexible membrane, a floating apparatus, a walkway structure, and a structural support. The flexible membrane defines a reservoir cell having an open, upward-facing side which rests above the surrounding water surface. The floating apparatus maintains the reservoir cell's buoyancy in a waterbody. The walkway structure is along the periphery of the open side of the reservoir cell. The structural support includes a lower frame structure connected by guide-lines to an upper frame structure. The reservoir cell is positioned within the structural support and is secured to the guide-lines. The guide-lines enable vertical motion of the reservoir cell sidewalls as the reservoir cell is filled or emptied during use. A bottom supporting structure enables the flexible membrane to maintain stability of the structure and maintain an organized shape of the flexible membrane as the sidewalls slide downward and upward. The walkway structure is attached to the frame and the lower frame structure is anchored to the bottom of the waterbody. The upper frame structure is secured to the floating walkway structure. The upper frame structure is attached to the floating apparatus (walkway) and is buoyant. The reservoir cell is secured to the upper and lower frame structures.

As described further below, the modular floating membrane reservoir system can be used as a reservoir for a closed-loop pumped storage hydroelectric power system. The proposed innovative design of the floating membrane reservoir system provides a transportable, modular, scalable, inexpensive floating membrane reservoir system. The floating membrane reservoir system also reduces environmental impacts and increase aesthetic and social acceptability of the closed-loop pumped storage hydroelectric power system. Moreover, the floating membrane reservoir system is stable during use, light-weight, simple to install, and can be pre-constructed. In addition, the modular floating membrane reservoir system can lead to reduced project construction and development timelines relative to alternative reservoir systems.

These and other features and advantages of the present disclosure will become apparent from the following description of particular embodiments, when viewed in accordance with the accompanying drawings and appended claims.

BRIEF DESCRIPTION OF THE DRAWINGS

FIG. 7 is a depiction of two options for attaching a reservoir cell to a guide-line.

DETAILED DESCRIPTION OF THE CURRENT EMBODIMENTS

Figure 1:
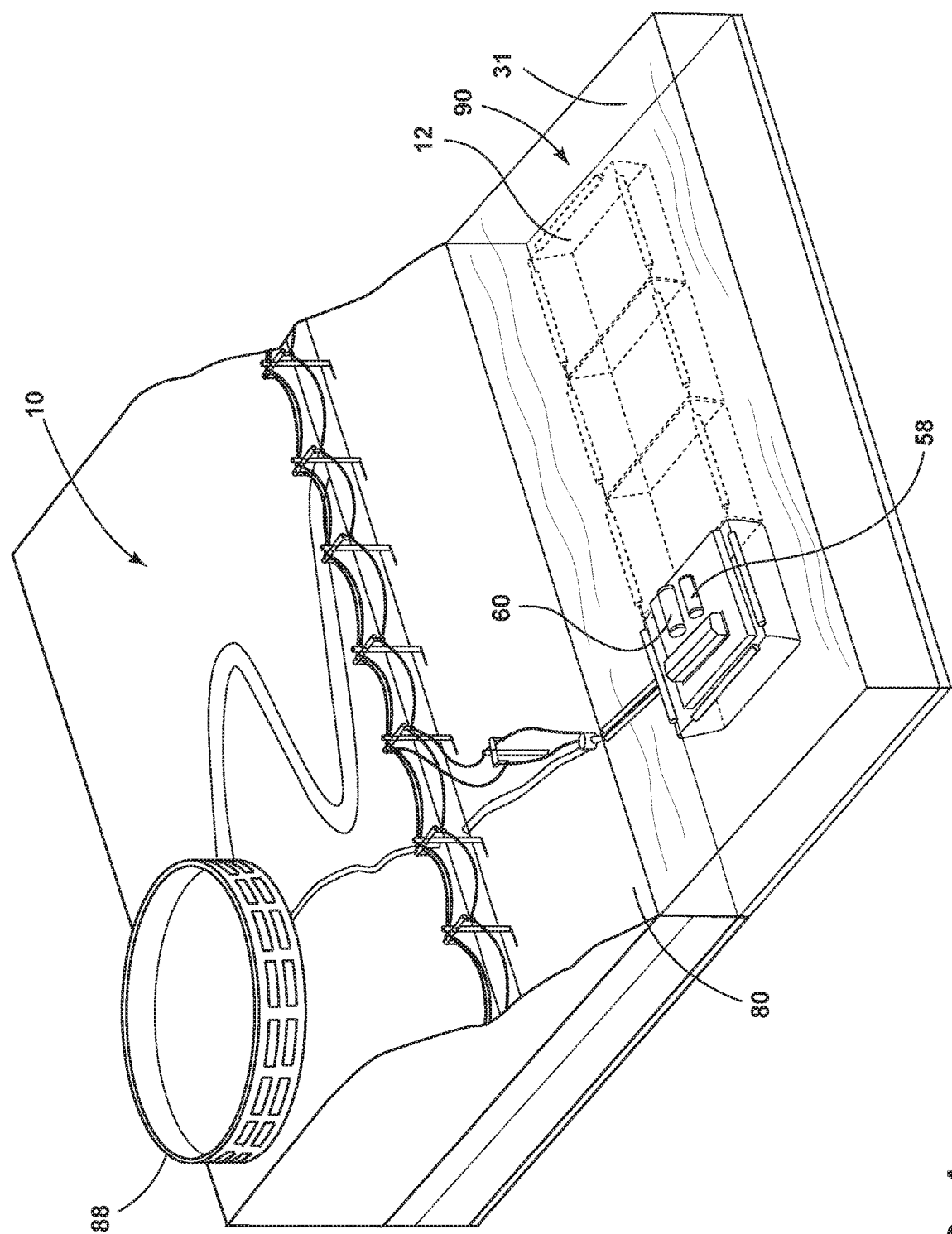
FIG. 1 is a diagram of a closed-loop pumped storage hydroelectric system including a modular floating membrane reservoir system as a lower reservoir.

Referring to FIG. 1, a closed-loop pumped storage hydroelectric power system is illustrated and generally designated 10. FIG. 1 represents a potential application of a modular floating membrane reservoir system 12 for use as a lower reservoir in a closed-loop pumped storage hydroelectric power system. Alternatively, the floating reservoir 12 could be used as an upper reservoir or for both an upper reservoir and a lower reservoir. In the current embodiment, the modular floating membrane reservoir system 12 includes a flexible membrane 14, a system of pontoons 16, a floating walkway structure 18, and a structural support 20. Each such feature of the modular floating membrane reservoir system 12 is described below.

Figure 2:
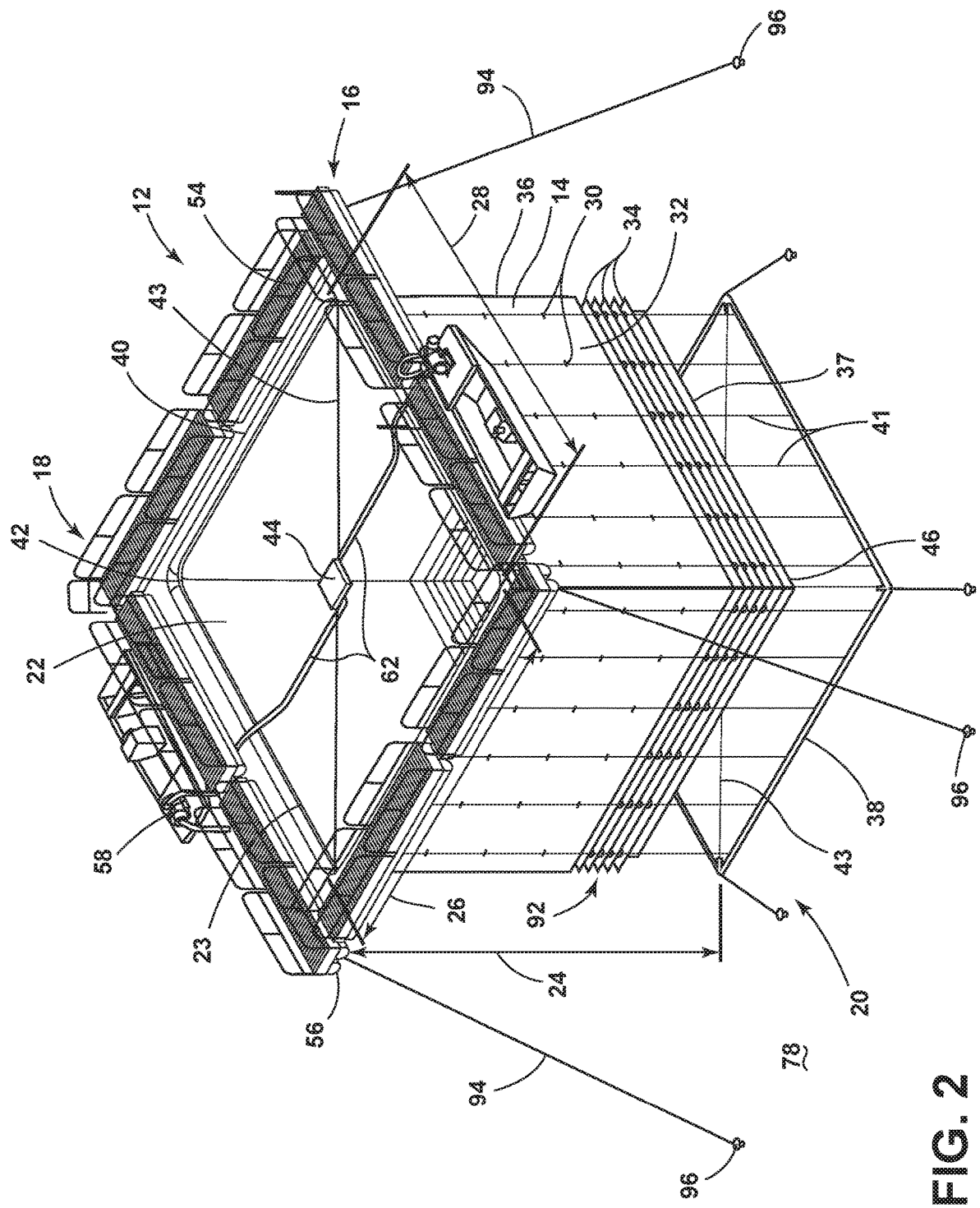
FIG. 2 is a perspective view of a modular floating membrane reservoir system.
Figure 10:
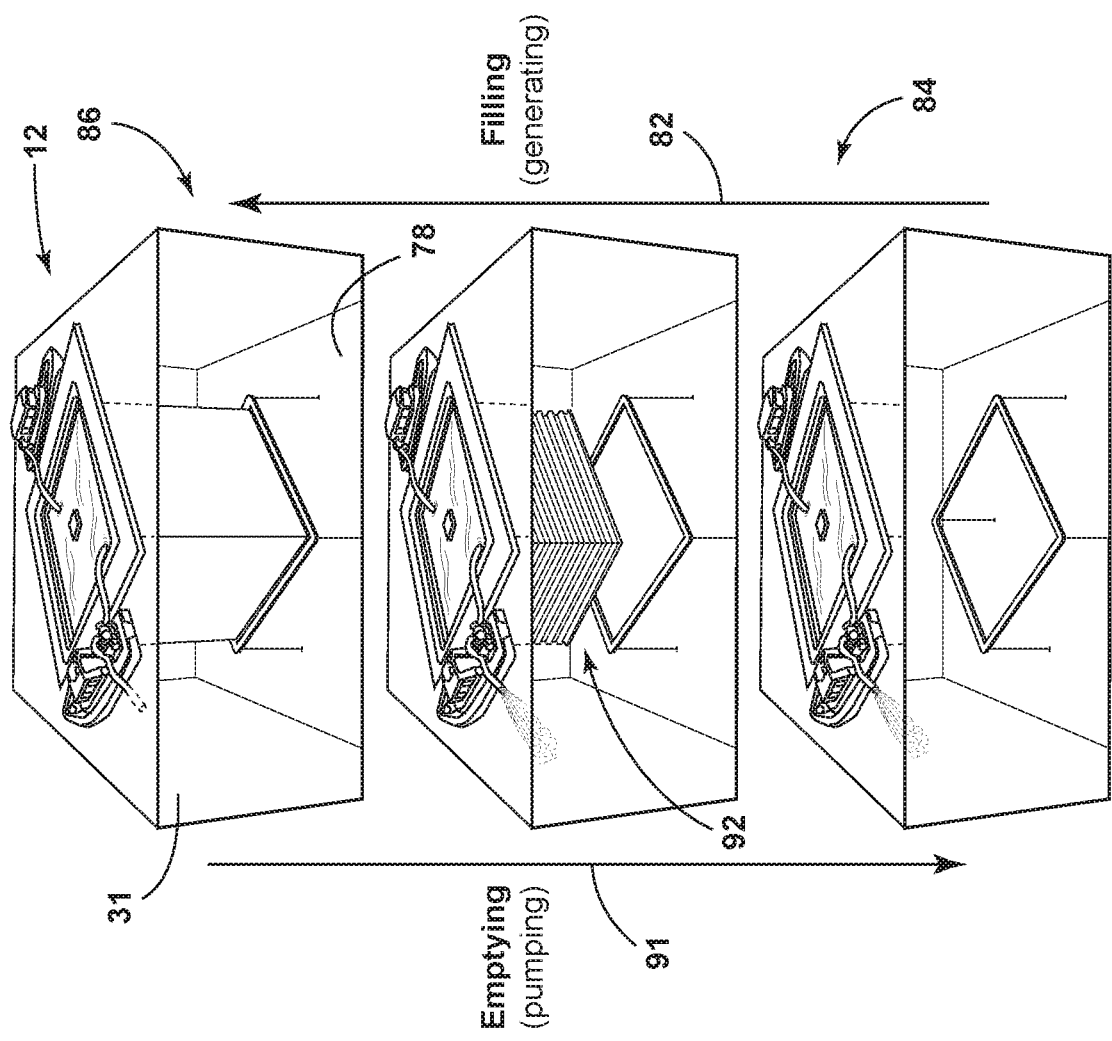
FIG. 10 is a diagram of a modular floating membrane reservoir system depicting emptying of a reservoir cell and filling of a reservoir cell for prototype testing purposes. For pumped storage hydropower applications, the method is closed-loop and would not pump water from or discharge water to the waterbody.

Referring to FIG. 2, the flexible membranes 14 defines a reservoir cell 22. The reservoir cell 12 includes a variable volumetric capacity for carrying fluid and may define any of a number of shapes including cuboid, as depicted in FIGS. 2 and 10. The reservoir cell 22 also includes an open side 23. The reservoir cell 22 includes a maximum depth 24, a width 26, and a length 28. The reservoir cell 22, or a plurality of cells, is optionally designed to meet the overall generation target of the pumped storage hydroelectric power system and the waterbody bathymetric limitations. The volumetric capacity of the reservoir cell 22 is optionally deigned to meet the storage requirement of the project.

The flexible membrane 14 may be manufactured of any of a variety of natural or synthetic materials including polyvinyl chloride (PVC) or polyuria. The flexible membrane 14 is buoyant, meaning that the flexible membrane 14 has a tendency to float within a waterbody 31 when the reservoir cell 12 is empty. Optionally, the flexible membrane 14 is manufactured from about 20 oz/yd$^2$ MIL-SPEC fabric to about 45 oz/yd$^2$ MIL-SPEC fabric. Further optionally, the flexible membrane 14 is manufactured of 22 oz/yd$^2$ MIL-SPEC MEHLER PVC or of 40 oz/yd$^2$ MIL-SPEC MEHLER PVC, or a combination thereof. The flexible membrane 14 may be any of a variety of colors including, for example, yellow or black.

Figure 3:
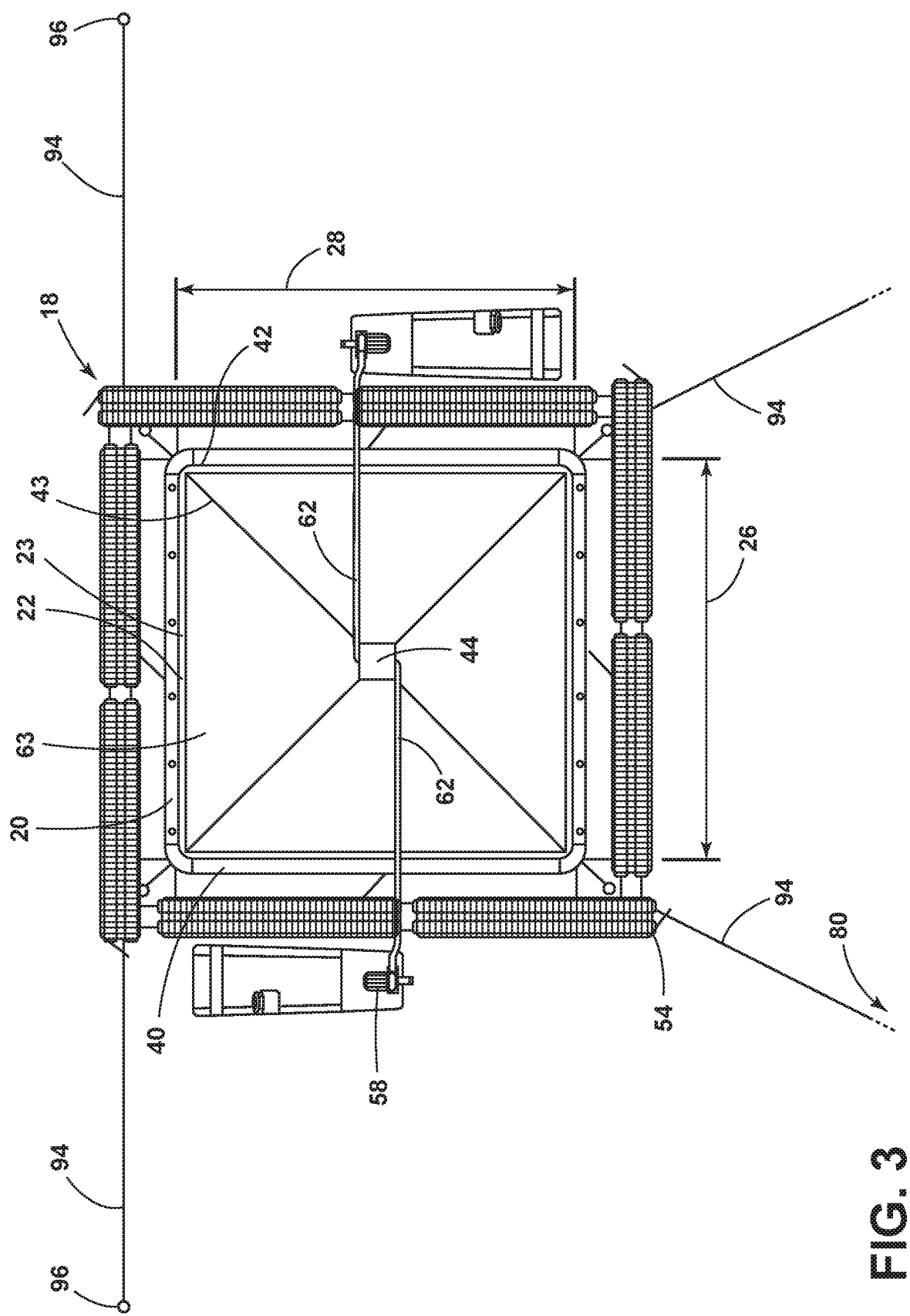
FIG. 3 is a top plan view of a modular floating membrane reservoir system.
Figure 5:
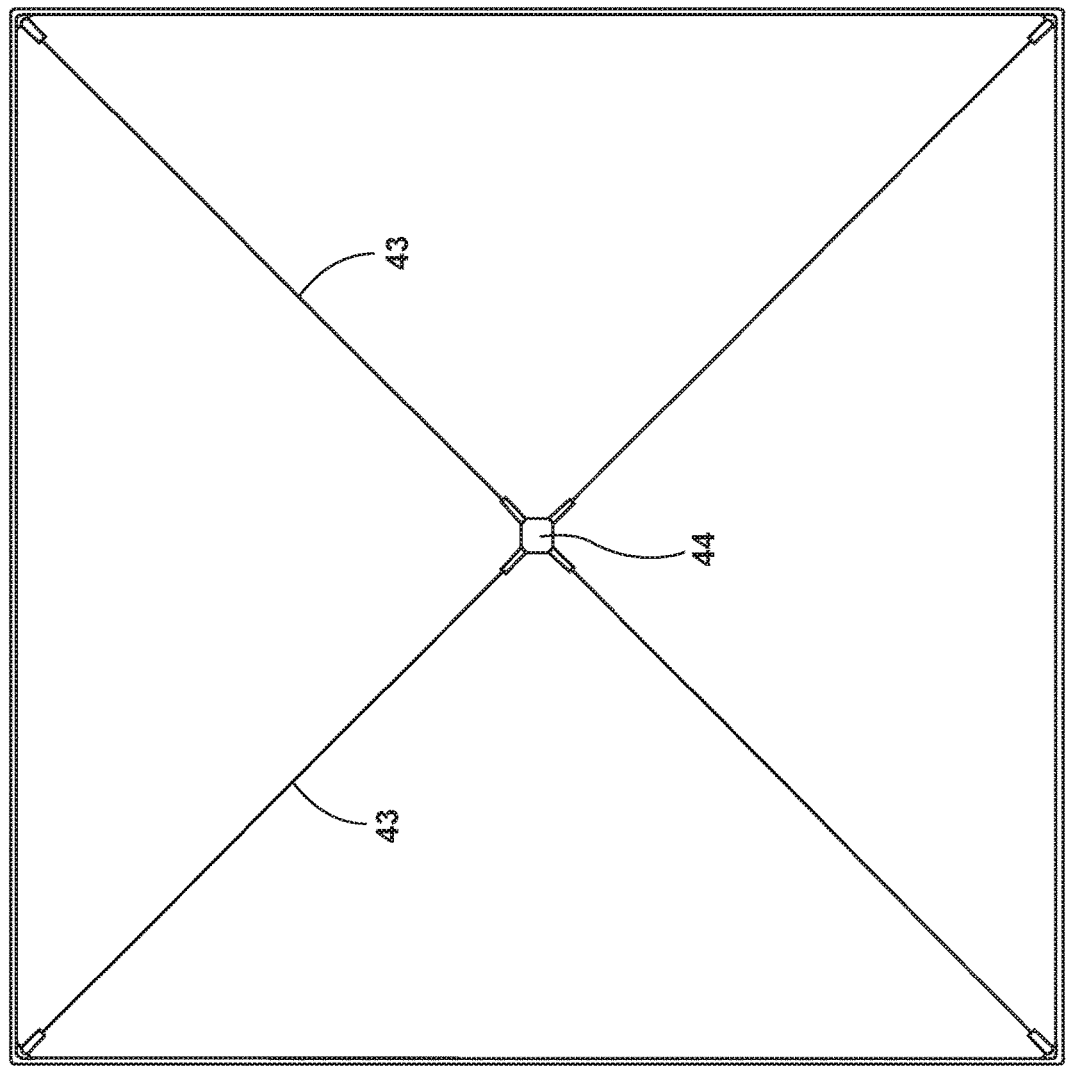
FIG. 5 is a bottom plan view of the lower frame structure.

The structural support 20 includes lower frame structure 38 (see especially FIGS. 3 and 5) and an upper frame structure 40 each connected to one another by a series of guide-lines 41. The upper frame structure 40 is buoyant and the reservoir cell 22 is secured to the upper frame structure 40. The reservoir cell 22 is secured to the upper frame structure 40 by a periphery 42 of the open side 23. The upper frame structure 40 can be a pontoon manufactured of rolled aluminum. The guide-lines 41 may be connected to the upper frame structure 40 and the lower frame structure 38 by turnbuckles. The lower frame structure 38 is not buoyant, and may be manufactured of corrosion-resistant metal, optionally corrosion-resistant steel or stainless steel. The lower frame structure 38 and the upper frame structure 40 cooperate to maintain the guide-lines 41 in tension. The guide-lines 41 may be manufactured of marine-grade stainless steel cables and may further optionally be covered by a sleeve (e.g., a PVC sleeve). The lower frame structure 38 and the upper frame structure 40 are optionally square in shape. The lower frame structure 38 and the upper frame structure 40 include tension lines 43 in combination with a tension plate 44 to enhance the structural rigidity of the lower frame structure 38 and the upper frame structure 40, respectively. The tension lines 43 assist in rendering the structural support 20 semi-rigid.

The reservoir cell 22 is disposed within the structural support 20 and oriented such that the open side 23 faces the upper frame structure 40 and a bottom 46 of the reservoir cell 22 faces the lower frame structure 38. The reservoir cell 22 is slidably secured to the guide-lines 41 by the tabs 30, as shown especially in FIGS. 6 and 7. The individual tabs 30 may be oriented in a variety of configurations including generally horizontal or generally vertical. The tabs 30 may be connected directly to the guide-lines 41, as shown in FIG. 7 (sub-part A), by feeding a guide-line 41 through a tab aperture 48 defined by each tab 30. The tab aperture 48 includes a grommet 50, optionally manufactured of a corrosion-resistant material such as brass or stainless steel. Each tab 30 may be reinforced structurally by a bolt rope. As shown in FIG. 7 (sub-part B), the tabs 30 may be indirectly connected to the guide-lines 41 by chains 52 slidably secured at an end to the guide-lines 41 and rigidly secured at another end to the tabs 30. In various embodiments, the chain may be replaced with connectors suitably achieving the same function; for example, a flexible steel cable or a rope. In various embodiments, the guide-lines 41 are manufactured of marine grade stainless steel. In various embodiments, the flexible steel cables may be replaced by tubes, ropes, or cables manufactured of any number of materials including metals, alloys, or polymers including, optionally, PVC.

Figure 4:
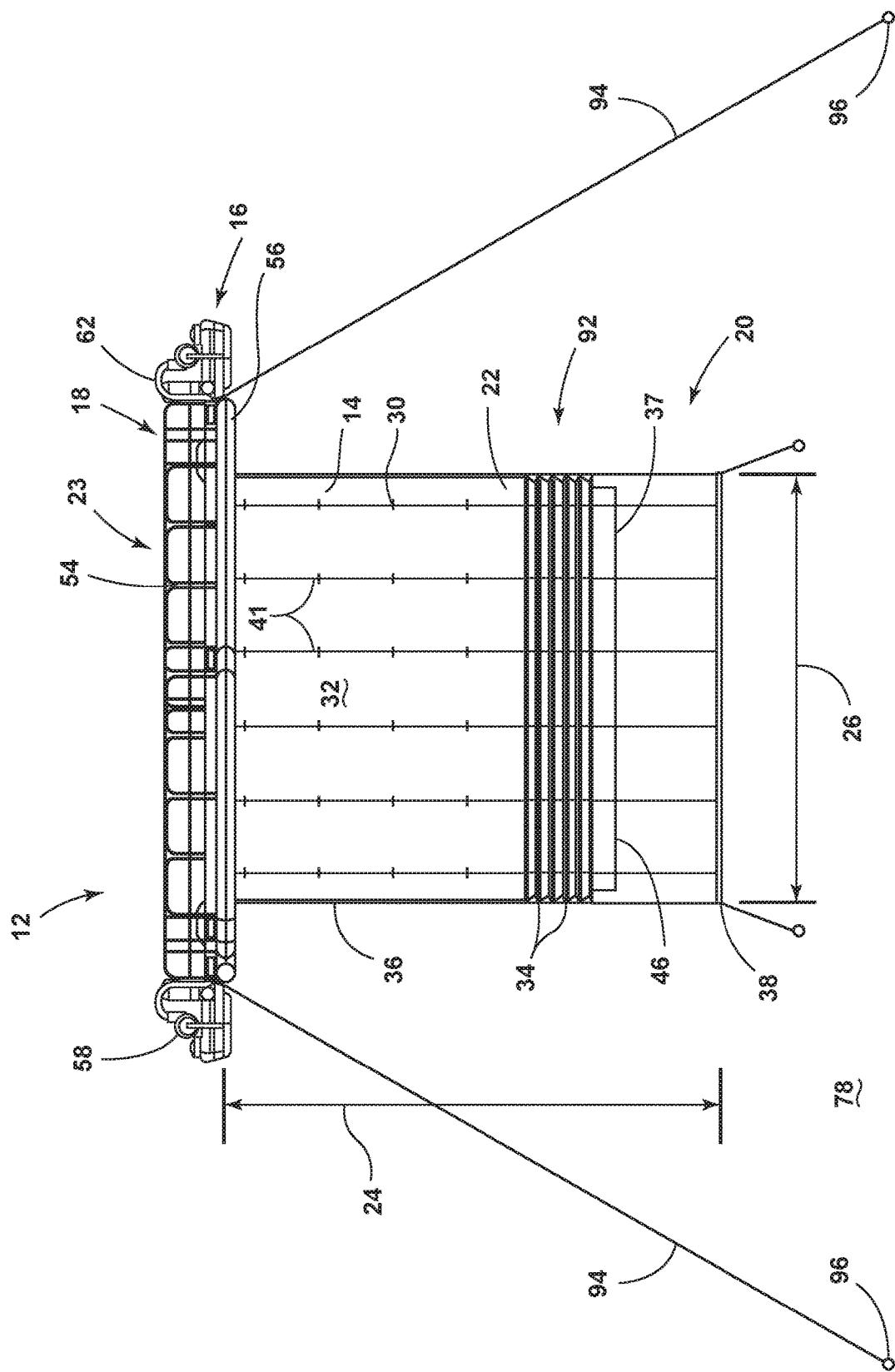
FIG. 4 is a side elevation view of a modular floating membrane reservoir system.

Referring again to FIGS. 2-4, the floating walkway structure 18 includes modular floating walkways 52 and runs along the periphery 42 of the open side 23 of the reservoir cell 22. The modular floating walkways 52 are rendered buoyant by pontoons 56. The floating walkway structure 18 is secured to the upper frame structure 40. The modular floating walkways are optionally from about 4 feet to about 6 feet wide and from about 10 feet to about 20 feet long, having side rails and a gate along an interior side and an exterior side. Optionally, the floating walkway structure 18 is manufactured as a unit and not assembled from individual sections of platform grating 54. The modular floating walkways 52 can include pontoon bumpers (not shown).

As shown in FIG. 1, the modular floating membrane reservoir system 12 can include a pump 58 and/or a turbine generator 60. The pump 58 or the turbine generator 60 can be coupled to a pipe(s) 62, and the pipe(s) 62 can be secured to the tension plate 44 disposed at a central position with respect to the reservoir cell 22 (FIG. 2). The pipe 62 connected to the pump 58 can be a distribution pipe 62 including offset holes around a bottom of the distribution pipe 62. The reservoir cell 22 can be reversibly covered by a cover membrane 63 supported by guide cables (not shown) secured at each end to opposing sides of the upper frame structure 40.

Figure 6:
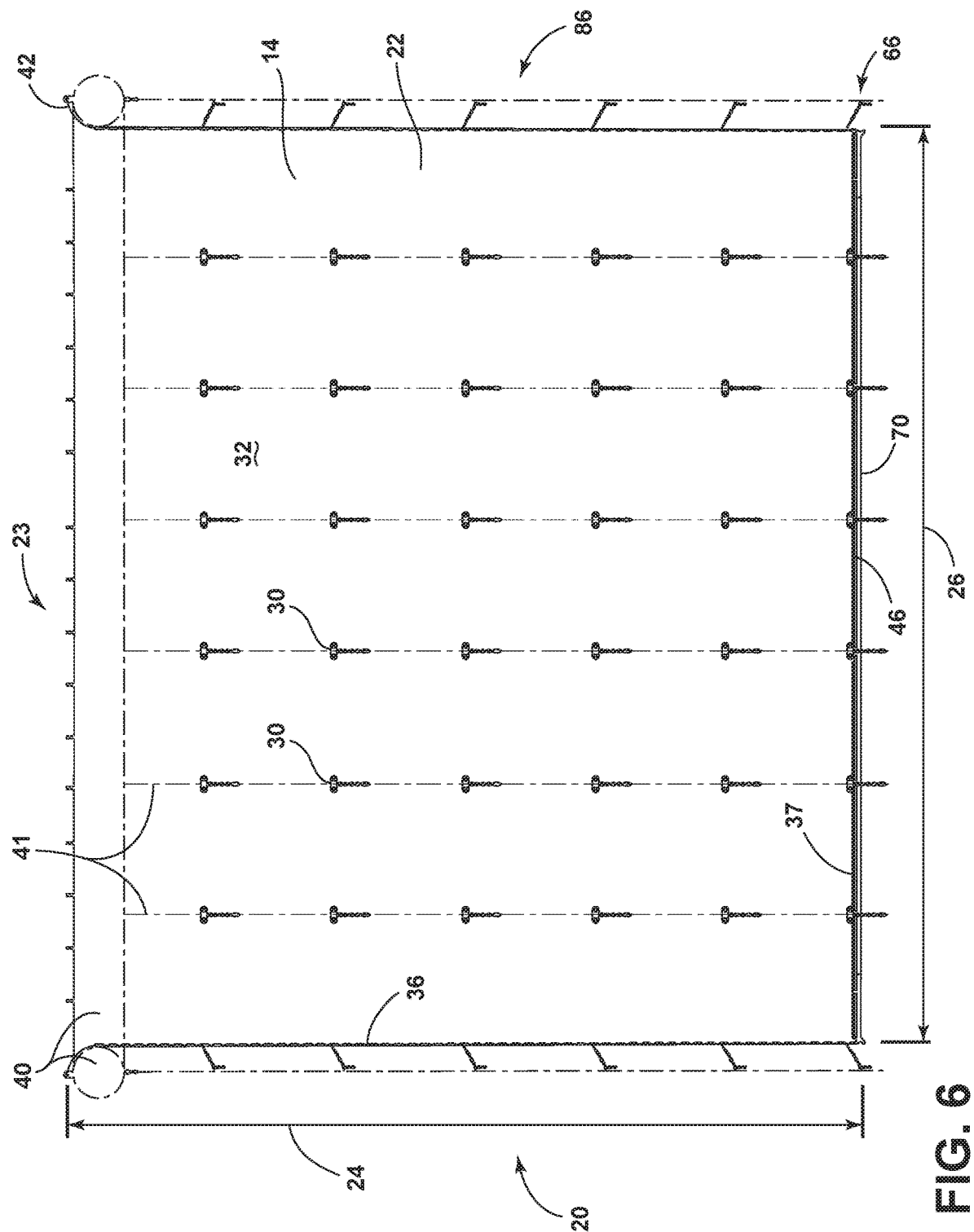
FIG. 6 is an elevation view of a reservoir cell attached to an upper frame structure.

As depicted in FIGS. 6 and 7, a plurality of tabs 30 are secured to and extending from a sidewall 32 of the reservoir cell 22. The tabs 30 may be secured to the sidewall 32 by welding. The reservoir cell 22 is liquid-tight (impermeable to water) so that liquid within the reservoir cell 22 can only exit through the open side 23 or through openings defined by the flexible membrane 14 for the express purpose of allowing liquid to enter or exit the reservoir cell 22 therethrough.

Figure 8:
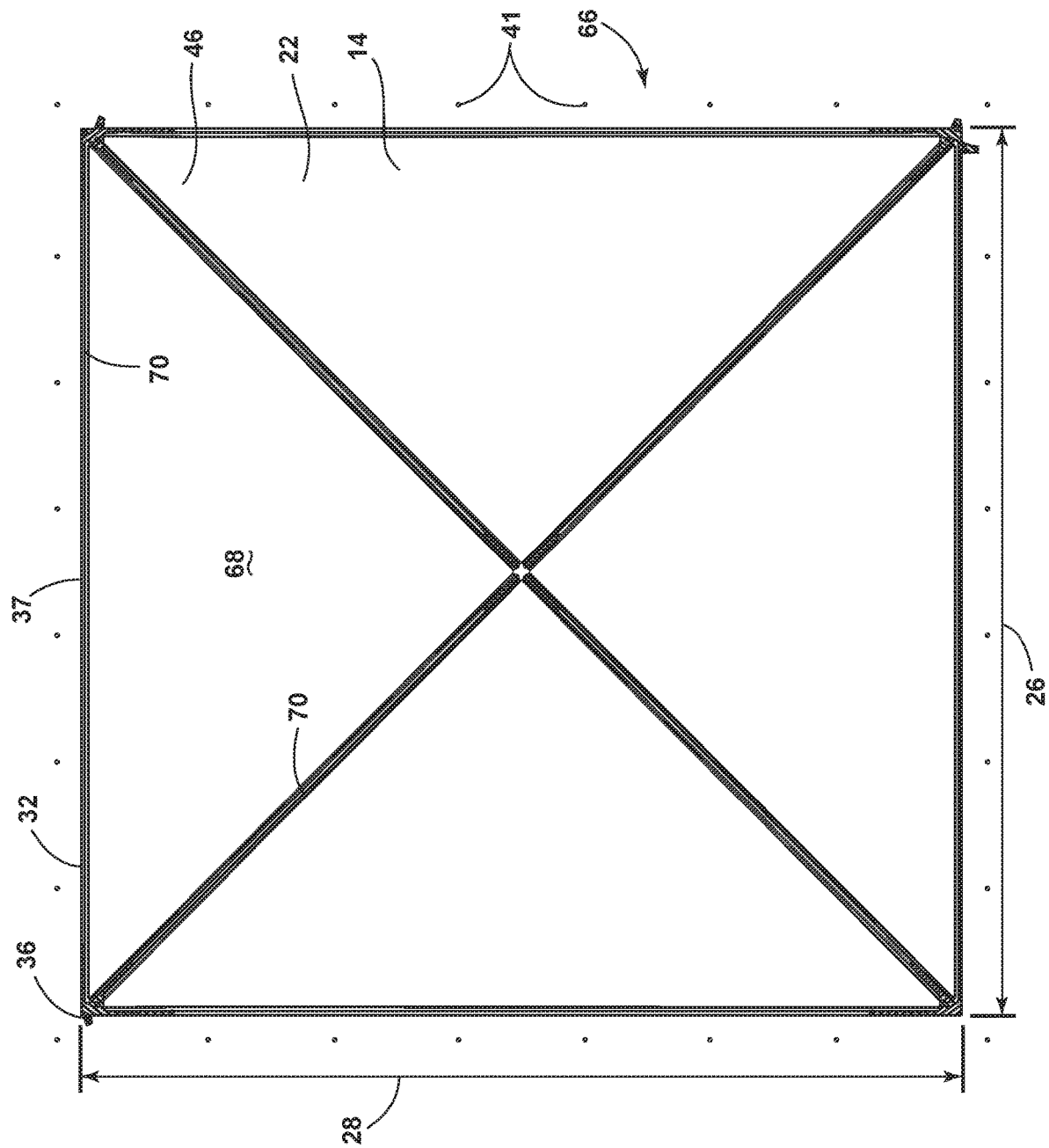
FIG. 8 is a bottom view of a reservoir cell disposed within guide-lines.
Figure 9:
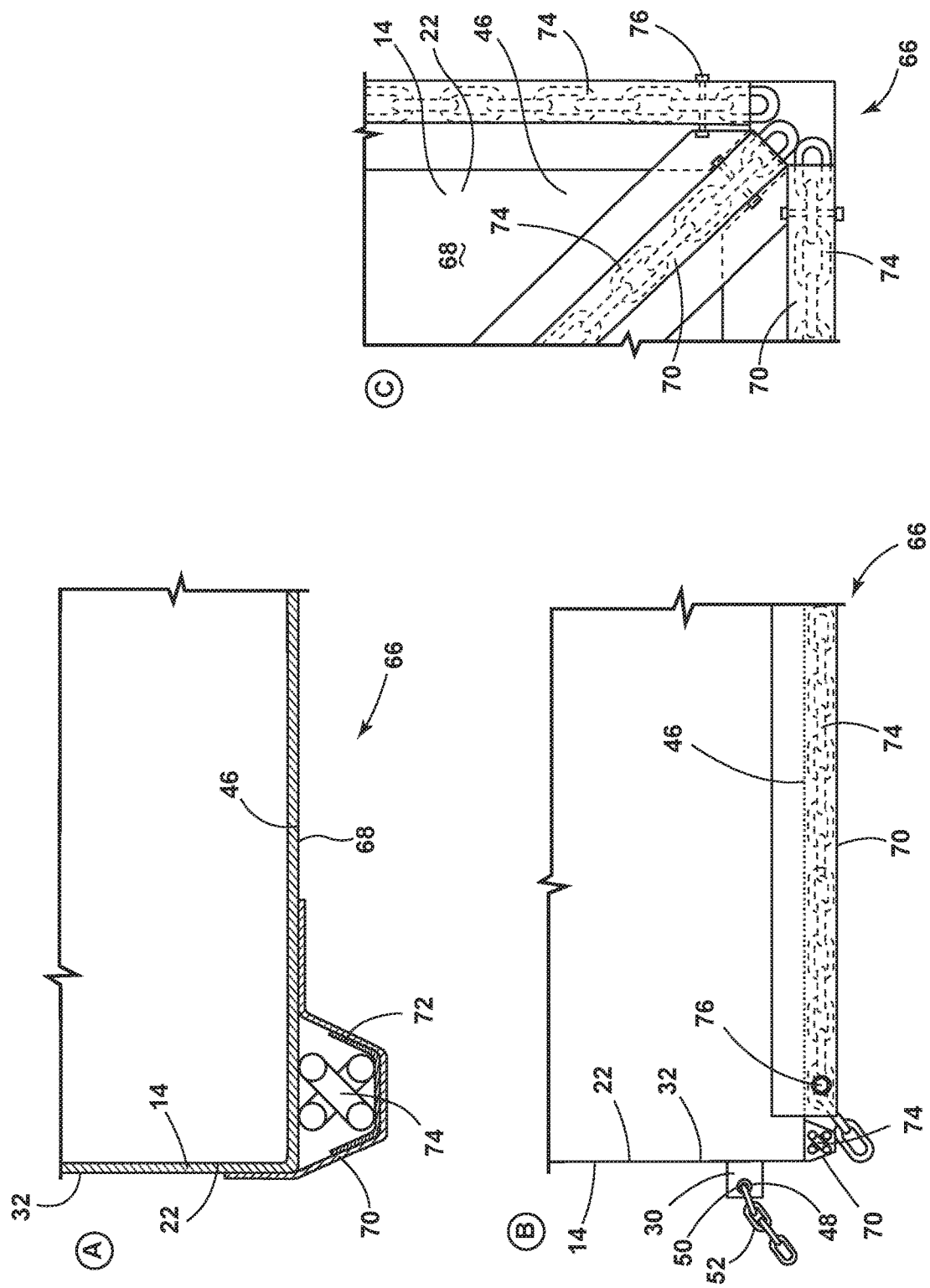
FIG. 9 includes a first side view, a second side view, and a top view showing chain pockets welded to a bottom of a reservoir cell and chains disposed within the chain pockets.

As shown in FIGS. 8 and 9, a structural reinforcement system 66 is attached to the bottom 46 of the reservoir cell 14. A surface 68 of the bottom 46 of the reservoir cell 14 has secured thereto chain pockets 70. The chain pockets 70 may be welded to the reservoir cell 14. Each chain pocket 70 is reinforced with a doubler 72 for abrasion resistance. The chain pockets 70 may be manufactured of the same material as the flexible membrane 14 and the doubler 72 may be an extra layer of flexible membrane 14 material. Within each chain pocket 70 is disposed a tension chain 74. The tension chains 74 are each secured at the end of the chain pocket 70, as shown in FIG. 9. The chain pockets 70 generally line a perimeter of the bottom 46 of the reservoir cell 14 and also span the surface 68 of the bottom 46 of the reservoir cell 14 connecting diagonally opposite vertices to form an "X" shape, as shown in FIG. 8. FIGS. 9 B and C show how the tension chains 74 are secured within the chain pockets 70 at a vertex of the bottom 46 of the reservoir cell. FIG. 9A provides a detailed view of how the chain pockets 70 may be attached to the bottom 46 of the reservoir cell 14 and how the tension chains 74 may be disposed within the chain pocket 70. The tension chains 74 may be secured within the chain pockets 70 using a bolt 76 in combination with grommets 50 installed within walls of the chain pockets 70. The grommets 50 are optionally manufactured of a corrosion-resistant material such as brass or stainless steel. In various embodiments, the tension chains 74 may be other than a chain, such as a rope, a cable, or a pipe.

A method of storing water for a closed-loop pumped storage hydroelectric system 10 is provided below. The method includes providing the modular floating membrane reservoir system 12, including a floating reservoir cell 22 buoyed by a plurality of pontoons 16 adjacent an outer periphery 42 of the reservoir cell 22. The method further includes positioning the floating membrane reservoir system 12 in a waterbody 31 while maintaining separation between the floating reservoir 12 and a streambed 78 or a bank 80 of the waterbody 31. Pontoon bumpers (not shown) can help to properly position the pontoons 16 and prevent damage from impact as the floating reservoir 22 responds to conditions in the waterbody 31. The structural support 20 can prevent rocking motion of the entire floating reservoir 12 and vibration of the sidewall 32. The waterbody 31 can be, for example, a lake, a river, or a man-made reservoir. If the waterbody 31 is a river, the floating reservoir 12 is generally disposed within a dead zone or region of low current. The pontoons 16 maintain the floating reservoir 12 in a floating condition to ensure a vertical position relative to a water surface elevation necessary to prevent overtopping of the reservoir cell 22 leading to an exchange of liquid to or from the waterbody 31.

The method further includes loading the floating reservoir 12 with a volume of water from a source other than the surrounding waterbody. FIG. 10 illustrates emptying and filling of a prototype floating membrane system for testing purposes only. For testing purposes, the floating reservoir is loaded and emptied with water from the waterbody. For pumped storage hydropower application, the method would be closed-loop and would not pump water from or discharge water to the waterbody. During filling 82 the reservoir cell 22 expands and unfolds toward the lower frame structure 38 from the upper frame structure 40 from a fully folded and empty configuration 84 to assume a full configuration 86. When the floating reservoir 12 is applied to a pumped storage hydroelectric system 10, water is typically pumped to an upper reservoir 88 during periods of low electrical demand and released to a lower reservoir to generate electricity during periods of increased electrical demand. The pumped storage hydroelectric system 10 can optionally include a lower reservoir 90 comprising a plurality of floating reservoirs 12 or a plurality of reservoir cells 22. It can be optionally used in standalone application with only a single reservoir cell. When water is removed during emptying 91 from within the floating reservoir 12, optional creases 34 or seams 34 of the flexible membrane 14 cause the flexible membrane 14 to fold uniformly into a predetermined configuration 92 as the buoyancy of the flexible membrane 14 encourages the reservoir cell 22 vertically upward toward the upper frame structure 40 and away from the lower frame structure 38 to eventually assume a fully folded 84 configuration when the reservoir cell 22 is empty. Optionally, the pre-determined configuration 92 is an accordion-shaped folding pattern. The structural support 20 guides a sidewall 32 of the reservoir cell 22 as the floating reservoir 12 is filled or emptied during use. As can be ascertained from the above description, the flexible membrane 14 includes a vertically collapsible sidewall 32 such that the reservoir cell 22 defines a depth that varies, as shown in FIG. 10, based on the internal volume of water contained therein.

Positioning the floating reservoir 12 in a waterbody 31 includes anchoring the floating walkway structure 18 and the lower frame structure 38 within the waterbody 31. The floating walkway structure 18 or the lower frame structure 38 may be anchored to the streambed 78 (alternatively, bed) of the waterbody 31 or to the bank 80 of the waterbody 31. The walkway structure 18 and the lower frame structure 38 are anchored by anchor lines 94 secured to an anchor 96, optionally a concrete anchor 96. Anchoring of the lower frame structure 38 maintains the lower frame structure 38 in a stable and static state. Anchoring the floating walkway structure 18 and the lower frame structure 38 within the water body 32 prevents lateral motion of the floating reservoir 12 within the waterbody 31. The anchoring of the floating walkway structure 18 and of the lower frame structure 38 within the water body 32 accommodates water level fluctuations. Optionally, the anchor lines 94 are manufactured of a polymeric material, a metal, or a metal alloy including, optionally, marine grade stainless steel.

Referring again to FIGS. 2, 3, 4 and 10, a prototype floating membrane system is shown. For testing purposes, the figures show one or multiple pumps which may be housed on one or multiple boats to provide convenient transport, security, and containment. The method does not specify the electromechanical equipment and associated material required for pumped storage hydroelectric application. As such, the boats shown in the figures are used to illustrate an example for prototype testing purposes only.

The method can further include installing a trash boom (not shown) to protect the floating reservoir 12 from being impacted by floating debris from the waterbody 31 that may damage the reservoir cell 22. The floating walkway structure 18 can serve as further protection against floating debris impacting and damaging the reservoir cell 22 or other components.

The modular floating membrane reservoir system includes improvements over prior lower reservoirs used with closed-loop pumped storage hydroelectric power systems including, for example, modularity, transportability, ease of installation, and minimal environmental impacts. The modular floating membrane reservoir system is relatively inexpensive and, by being installed in a preexisting waterbody, the modular floating membrane reservoir system does not require major civil works and environmental disruption for installation. The modular floating membrane reservoir system, unlike previous lower reservoirs of closed-loop storage hydroelectric power systems, is adaptable and scalable, in part on account of its modularity, so that the membrane reservoir system can accommodate installation demands of various sites.

The above description is that of current embodiments. Various alterations can be made without departing from the spirit and broader aspects of the invention as defined in the claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method of storing water for a closed-loop pumped storage hydroelectric power system, the method comprising:
providing a floating reservoir including a structural support and a flexible membrane defining a reservoir cell, the structural support including a lower frame structure spaced apart from an upper frame structure and a plurality of guidelines therebetween, the reservoir cell being buoyed by a plurality of pontoons adjacent a periphery of the reservoir cell;
positioning the floating reservoir in a waterbody while maintaining separation between the floating reservoir and a bed or a bank of the waterbody;
loading the floating reservoir with an internal volume of water from a source other than the surrounding waterbody for closed-loop application; and
transferring water from within the floating reservoir to an upper or lower reservoir of the closed-loop pumped storage hydroelectric system, wherein the flexible membrane includes a vertically collapsible sidewall that is slideably secured to the plurality of guidelines, such that the reservoir cell defines a depth that varies based on the internal volume of water contained therein while the lower frame structure remains spaced apart from the upper frame structure by a fixed distance.

2. The method of claim 1 wherein the reservoir cell is one of a plurality of reservoir cells of the floating reservoir.

3. The method of claim 1 wherein the plurality of guidelines permit the vertically collapsible sidewall to reversibly lengthen during use.

4. The method of claim 1 further comprising anchoring the floating reservoir within the waterbody.

5. The method of claim 1 wherein the reservoir cell is positioned within the structural support.

6. The method of claim 5 wherein the structural support defines a cuboid and wherein the plurality of guidelines extend vertically for interconnecting the lower frame structure and the upper frame structure.

7. A modular floating membrane reservoir system, comprising:
a flexible membrane defining a reservoir cell for containing a volume of water therein;
a plurality of pontoons for maintaining the reservoir cell buoyant in a waterbody;
a walkway along at least a portion of a periphery of the reservoir cell; and
an outer structural support including a lower frame structure connected to an upper frame structure and a plurality of vertical guidelines therebetween, wherein the reservoir cell is disposed within the outer structural support, and wherein the flexible membrane includes a vertically collapsible sidewall that is slideably secured to the plurality of vertical guidelines, such that the reservoir cell defines a depth that varies based on the volume of water contained therein while the lower frame structure remains spaced apart from the upper frame structure by a fixed distance for use as a variable capacity lower reservoir of a closed-loop pumped storage hydroelectric power system.

8. The system of claim 7 wherein the plurality of vertical guidelines interconnect the upper frame structure and the lower frame structure.

9. The system of claim 7 wherein the plurality of vertical guidelines permit the vertically collapsible sidewall to reversibly lengthen during use.

10. The system of claim 7 wherein the reservoir cell includes a removable cover.

11. The system of claim 7 wherein the reservoir cell defines a maximum storage capacity.

12. The system of claim 7 wherein the walkway includes platform grating.

13. The system of claim 7 wherein the reservoir cell defines a cylindrical shape.

14. The system of claim 7 wherein the reservoir cell is a first reservoir cell, the system further comprising a second reservoir cell adjacent to the first reservoir cell.

15. A modular floating membrane reservoir system, comprising:
a flexible membrane defining a reservoir cell for containing a volume of water therein;
a walkway positioned along an exterior portion of the reservoir cell; and
a structural support surrounding the flexible membrane and including a lower frame structure, an upper frame structure, and a plurality of guidelines extending therebetween;
wherein the flexible membrane includes a vertically collapsible sidewall that is slideably secured to the plurality of guidelines, such that the reservoir cell defines a depth that varies based on the volume of water contained therein while the lower frame structure remains spaced apart from the upper frame structure by a fixed distance for use as a variable capacity lower reservoir of a closed-loop pumped storage hydroelectric power system.

16. The system of claim 15 wherein the reservoir cell is one of a plurality of reservoir cells rigidly interconnected to each other.

17. The system of claim 15 wherein the plurality of guidelines permit the vertically collapsible sidewall to reversibly lengthen during use.

18. The system of claim 15 further including a removable cover extending over the reservoir cell.

19. The system of claim 15 wherein the walkway includes platform grating.

20. The system of claim 15 wherein the reservoir cell defines a cuboid shape.

* * * * *